United States Patent

Butler

[15] 3,697,506
[45] Oct. 10, 1972

[54] CRYSTALLINE ALKALI METAL SALTS OF α-CARBOXYBENZYLPENICILLIN AND PROCESS THEREFOR

[72] Inventor: Kenneth Butler, Old Lyme, Conn.
[73] Assignee: Pfizer Inc., New York, N.Y.
[22] Filed: Aug. 7, 1970
[21] Appl. No.: 62,138

Related U.S. Application Data

[63] Continuation-in-part of Ser. No. 804,275, March 4, 1969, which is a continuation-in-part of Ser. No. 768,497, Oct. 17, 1968, abandoned.

[52] U.S. Cl. ............................ 260/239.1, 424/271
[51] Int. Cl. .................................... C07d 99/16
[58] Field of Search ............................ 260/239.1

[56] References Cited

UNITED STATES PATENTS 3,142,673    7/1964    Hobbs et al. ............. 260/239.1
3,282,926    11/1966   Brain et al. .............. 260/239.1

*Primary Examiner*—Nicholas S. Rizzo
*Attorney*—Connolly and Hutz

[57] ABSTRACT

Crystalline mono-alkali metal and crystalline di-alkali metal salts of α-carboxybenzylpenicillin and a process for their preparation from crude and amorphous forms of a α-carboxybenzylpenicillin and salts thereof, and from aqueous and organic solvent solutions of α-carboxybenzylpenicillin and salts thereof.

13 Claims, No Drawings

CRYSTALLINE ALKALI METAL SALTS OF α-CARBOXYBENZYLPENICILLIN AND PROCESS THEREFOR

CROSS-REFERENCE TO RELATED APPLICATIONS

This application is a continuation-in-part of my copending application, Ser. No. 804,275, filed Mar. 4, 1969, which in turn is a continuation-in-part of application, Ser. No. 768,497, filed Oct. 17, 1968, now abandoned.

BACKGROUND OF THE INVENTION

This invention relates to a novel, convenient, and economic process for producing crystalline, stable forms of α-carboxybenzylpenicillin. More particularly, it relates to the production of crystalline mono-alkali metal and crystalline di-alkali metal salts of α-carboxybenzylpenicillin.

The valuable broad spectrum penicillin, α-carboxybenzylpenicillin, is described in U.S. Pat. No. 3,142,673 and in British Pat. 1,004,670 along with the preparation of various salts of this valuable penicillin, including the di-alkali metal salts. U.S. Pat. No. 3,142,673 also described the preparation of the mono-alkali metal salts. However, the alkali metal salts, as produced by the procedures of these references, are amorphous rather than crystalline materials.

The relatively high polar nature of α-carboxybenzylpenicillin—coupled with its susceptibility to degradation, particularly at elevated temperatures and especially in alkaline solutions of about pH 9 or higher or in acid solutions of about pH 4 or lower, to products such as benzyl-penicillin, penicilloic acid, and penicillenic acid and the presence of inorganic salts arising from the methods used for its preparation—renders the formation of its crystalline alkali metal salts difficult.

An amorphous salt is, in general, less desirable than is a crystalline form thereof from a preparative, sales, storage, and use standpoint. The physical properties of an amorphous salt, such as ease of handling, dispersion in solution, rate of solution, color of the salt, and solution thereof, are generally inferior to those of a crystalline form of the same salt. Additionally, amorphous forms of a salt are frequently more hygroscopic than is a crystalline form of said salt.

For pharmaceutical usage, the above-mentioned inferior properties of an amorphous salt, relative to those of a crystalline form of the salt, are especially detrimental. The formation of acceptable dosage forms, such as solutions, suspensions, elixirs, tablets, capsules, and various pharmaceutically elegant preparations required and demanded by the medical and pharmaceutical professions, is rendered difficult or impossible with an amorphous salt.

In the case of α-carboxybenzylpenicillin, the disadvantages of amorphous forms of its mono- and di-alkali metal salts are of great concern since it is an extremely effective broad spectrum penicillin. The preparation of crystalline forms of its alkali salts and, particularly, of its sodium salt is, therefore, of vital interest to the pharmaceutical and medical professions.

SUMMARY OF THE INVENTION

It has been found that stable, crystalline forms of the mono-alkali metal and di-alkali metal salts of α-carboxybenzylpenicillin, including its epimers or stereoisomers, can be conveniently prepared from aqueous or organic solvent solutions of α-carboxybenzylpenicillin and salts thereof, and from crude and amorphous forms of α-carboxybenzylpenicillin and salts thereof. The process utilizes readily available equipment and is characterized by ease of manipulation, overall economy, and high quality of the crystalline salts. The stable crystalline products of the present invention are useful in the same dosage forms and amounts for the same purposes as are the amorphous prior art products but do not share the above-mentioned shortcomings of the amorphous products.

By the term "α-carboxybenzylpenicillin and salts thereof" is meant not only the alkali metal salts, e.g., sodium and potassium, but also the alkaline earth salts (calcium, magnesium, barium), the ammonium salt and substituted ammonium salt, e.g., procaine, dibenzylamine, N,N'-dibenzylethylenediamine, 1-ephenamine, N-ethylpiperidine, diethylamine, triethylamine, and salts with other amines which have been used to form salts with benzylpenicillin. It further includes the mono- and di- salts of α-carboxybenzylpenicillin and its epimers. However, in view of the acidification step in the herein-described process which converts the above-mentioned salts to the acid form of α-carboxybenzylpenicillin, all the salts are equivalent in this process. From a practical standpoint, the crude and/or amorphous disodium salt of α-carboxybenzylpenicillin is the usual starting material for this process.

Alpha-carboxybenzylpenicillin is highly susceptible to degradation, e.g., decarboxylation to benzylpenicillin and hydrolysis to penicilloic and penicillenic acids. Decarboxylation is readily brought about by heat. Hydrolysis occurs at both acid and alkaline pH levels and especially at pH values above about 9 and below about 4. Hydrolytic degradation, of course, increases with an increase in temperature.

The process of this invention, therefore, achieves a balance as regards the above parameters of temperature and pH. Additionally, other parameters, such as solubility factors and concentrations of reactants, are carefully woven into a unified process which conveniently affords the desired crystalline mono-alkali and di-alkali metal salts. By the term "alkali metal" salts, as used herein, is meant the sodium and potassium salts.

The process, in general, comprises a multiple extraction process which permits formation of concentrated solutions of α-carboxybenzylpenicillin without the use of heat and avoids the need for spray-dry or freeze-dry processes. A multiple extraction process need not be used if the concentration of α-carboxybenzylpenicillin or salts thereof in the aqueous solution is equivalent to at least about 5 percent (based on α-carboxybenzylpenicillin acid) concentration by weight. It is, however, desirable for concentrations less than about 5 percent by weight.

Preparation of the crystalline sodium and potassium salts of α-carboxybenzylpenicillin from aqueous solutions of α-carboxybenzylpenicillin and salts thereof, such as are produced by the methods of U.S. Pat. No.

3,142,673 and British Pat. 1,004,670, or by alkaline hydrolysis of an aryl, e.g., phenyl, ester of α-carboxybenzylpenicillin, according to one embodiment of the present invention, comprises:

a. adjusting the pH of an aqueous alkaline solution of α-carboxybenzylpenicillin to about 2 to about 3.5,
b. extracting the acid solution thus produced with a water-immiscible organic solvent,
c. back-extracting the water-immiscible organic solvent extract with water at a pH of from about 4.0 to about 8.0,
d. adjusting the pH of the aqueous extract thus produced to a value of from about 2 to about 3.5,
e. extracting the aqueous acid solution thus produced with a water-immiscible organic solvent,
f. drying said water-immiscible organic solvent extract to a water content of from about 3 percent to about 20 percent by weight,
g. treating said dried extract with the proper proportion of an alkali metal salt of an organic acid, such as potassium or sodium salts of 2-ethyl hexanoic, caproic, oleic, ascorbic, glycolic, propionic, acetic, succinic, cinnamic, caprylic, and citric acids, or with sodium or potassium hydroxide, methoxide, bicarbonate or carbonate to provide the corresponding mono- or di-alkali metal salt, and
h. separating the crystalline alkali metal salt.

An alternative, and favored embodiment of this invention, when the concentration of α-carboxybenzylpenicillin or salts thereof in the aqueous solution is about 5 percent by weight or higher, comprises proceeding directly from step (a) to step (e) with elimination of steps (b) through (d).

DETAILED DESCRIPTION OF THE INVENTION

The novel process of this invention can, as mentioned above, be used to prepare crystalline sodium and potassium salts of α-carboxybenzylpenicillin from aqueous solutions of α-carboxybenzylpenicillin and salts thereof, and from crude and from amphoteric forms of α-carboxybenzylpenicillin and its salts.

It is desirable, for the purpose of this invention, that the aqueous solution of α-carboxybenzylpenicillin or salt thereof have a concentration of α-carboxybenzylpenicillin equivalent to from about 0.5 percent to about 20 percent of the acid from by weight. It is preferred that the penicillin be present at a concentration of at least about 2 percent by weight in order to achieve optimum extraction of α-carboxybenzylpenicillin in subsequent steps.

The pH of the aqueous solution must be brought to a value of from about 2.0 to about 3.5. The desired pH range is from about 2.0 to about 3.0; the favored range is from about 2.5 to about 3.0. The preferred range is from about 2.8 to about 3.0 since within this range degradation of α-carboxybenzylpenicillin to α-carboxybenzylpenicilloic acid is minimized. The pH adjustment is conveniently accomplished by means of a mineral acid, such as hydrochloric, sulfuric, and hydrobromic acids. The acid solution is then extracted with a water-immiscible organic solvent, such as n-butanol, methyl isobutyl ketone, diethyl ether, diisopropyl ether. The preferred solvents for this extraction are n-butanol and methyl isobutyl ketone in view of their favorable partition coefficients for α-carboxybenzylpenicillin. Ethyl acetate and methyl ethyl ketone can also be used but, because of their greater solubility in water compared to that of the preferred solvent, result in poorer recovery yields. This loss in yield is corrected by adding high concentrations of inorganic salts to the aqueous phase prior to extraction with these solvents.

This extraction step can, of course, be conducted as a batch-wise or continuous process. Irrespective of the type of process used, a total volume of solvent equal to about one-half to one-third the volume of the aqueous acid solution has been found to permit satisfactory extraction of the α-carboxybenzylpenicillin. Larger volumes can, of course, be used but necessitate the handling and recovery of unnecessary volumes of solvent. Smaller volumes are not desirable since the recovery of desired product is decreased. The volume of organic solvent is advantageously regulated so as to provide a concentration of 60 -carboxybenzylpenicillin in the extract of from about 5 percent to about 10 percent.

The water-immiscible organic solvent extract is then back-extracted with water at a pH of from about 4.0 to about 8.0. The desirable pH range is from about 6.5 to 8.0. The preferred range is from about pH 7.0 to about 7.2. This particular step affords opportunity to concentrate the α-carboxybenzylpenicillin into a small volume of solution and to thus facilitate further processing. When the concentration of α-carboxybenzylpenicillin, or its equivalent weight of sodium or potassium salts, is about 5 percent or higher, this back-extraction is not necessary as previously noted.

The aqueous extract is next adjusted to pH of from about 2 to about 3.5 with a mineral acid and preferably to a pH of from about 2.2 to about 3.0 and the acidified solution then extracted with a water-immiscible organic solvent such as these mentioned above. The preferred water-immiscible organic solvents are n-butanol and methyl isobutyl ketone, in that order. When using methyl isobutyl ketone as solvent, a pH of about 2.2 is favored; and when using n-butanol, the favored pH is about 3.0. It is desirable, in this extraction step, to regulate the volume of organic solvent so as to provide a concentration of from about 10 percent to about 20 percent of α-carboxybenzylpenicillin in the total volume of extract to facilitate subsequent precipitation of the desired crystalline salt.

The water-immiscible organic solvent extract of α-carboxybenzylpenicillin, of course, contains a certain amount of water. This "wet" extract can be used, as such, in subsequent steps to produce the desired crystalline sodium or potassium salt of α-carboxybenzylpenicillin. However, it has been observed that if too much water is present in the extract, that is, if it is too wet, the crystalline product is difficult to filter, apparently because of a very small crystal size. On the other hand, if the extract is too dry, the salts tend to separate as amorphous rather than crystalline products.

It appears that a certain amount of water is highly desirable, in fact necessary, for optimum separation of the crystalline mono- or di-alkali metal salts. Too much water introduces mechanical problems and is, therefore, not desirable; and too little water tends to prevent or, at least, minimize crystal formation. The crystalline disodium salt, in fact, appears to be a hydrate.

It has been found that a water content of from about 3 percent to about 20 percent in the organic solvent extract is conducive to crystal formation; the preferred range is from about 5 percent to about 15 percent water. This degree of dryness is readily and conveniently achieved by drying the organic solvent extract with anhydrous sodium sulfate, the preferred drying agent in this process. Other drying agents, such as anhydrous calcium sulfate and anhydrous magnesium sulfate, can also be used. When using magnesium sulfate, it is desirable to moniter the drying so as to avoid dropping the water content below the aforementioned 3 percent level. Additionally, mechanical methods, such as filtration through cotton, and azeotropic drying, can also be used. Further, the drying can conveniently be accomplished by the simple expedient of adding dry solvent, e.g., n-butanol, to the n-butanol extract. The volume of dry n-butanol to be added depends, of course, upon the degree of dryness desired. The addition of one volume of dry n-butanol to the n-butanol extract will, for example, lower the water content of the extract to one-half its value.

The "dried" organic solvent extract is then treated with the appropriate molar proportion of the proper alkali metal salt of a suitable organic acid to form the desired crystalline mono- or di-alkali metal salt of $\alpha$-carboxybenzylpenicillin. Suitable salts are the alkali metal hydroxides and alkoxides; e.g., methoxides; and the alkali metal salts of organic acids having from two to about eighteen carbon atoms such as those enumerated above and which are somewhat soluble in organic solvents such as acetone, methyl isobutyl ketone, ethyl acetate, n-butanol, isopropanol, and/or in the water present in the $\alpha$-carboxybenzylpenicillin containing extract. The presence of from about 3 percent to about 20 percent water in said extract thus serves a dual purpose when using salts such as alkali metal acetates or hydroxides; i.e., as solvent and as a vital component of the crystallizing solution. The alkali metal salts of organic acids having from two to eight carbon atoms, such as acetic, butyric, caproic, and caprylic acids and the alkali methoxides are favored. The preferred organic acid salts are sodium and potassium 2-ethyl hexanoate because of their availability and adequate solubility in organic solvents.

The sodium or potassium 2-ethyl hexanoate, or other alkali metal salt, is desirably added in the form of a solution in acetone, methyl isobutyl ketone, ethyl acetate, n-butanol, isopropanol, or other organic solvent in which it is soluble to at least about 0.05 percent. The preferred solvent is n-butanol. When preparation of a crystalline mono-alkali metal salt, e.g., the monosodium salt, is desired, up to one mole of sodium 2-ethyl hexanoate, or other organic acid sodium salt, is used per mole of $\alpha$-carboxybenzylpenicillin. A molar proportion much greater than 1:1 at this stage tends to reduce the yield of monosodium salt through formation of the disodium salt. A molar proportion considerably less than 1:1 also results in reduced yields through incomplete reaction. A molar ratio of from about 0.8:1 to about 1.2:1 is preferred for mono- salt formation.

Formation of the crystalline di-alkali metal salts, e.g., the di-sodium salt, is achieved by using at least a 2:1 molar proportion of sodium 2-ethyl hexanoate (or equivalent salt) to $\alpha$-carboxybenzylpenicillin. In actual practice, it is preferred to employ up to a 20 percent excess of sodium 2-ethyl hexanoate (or equivalent salt) to ensure as complete precipitation of the disodium salt as possible. Similar considerations apply to the di-potassium salt.

The crystalline sodium or potassium salt (mono- or di- salt, depending on the proportion of sodium or potassium 2-ethyl hexanoate or other equivalent salt used) which precipitates is separated, e.g., by filtration, then washed and repulped with an organic solvent such as acetone, isopropanol, or isopropyl ether, then dried.

The products are conveniently dried at about 35° to 65° C. Other methods commonly used in the art are also applicable, as those skilled in the art will recognize, e.g., air-drying, drying under nitrogen, drying in vacuo. Higher temperatures, while operative, require close surveillance to avoid decomposition of the product and/or loss of water of hydration. A certain amount of water of hydration is desirable for stability of the crystalline disodium salt.

The crystalline disodium salt thus obtained is somewhat hygroscopic but considerably less so than is the amorphous disodium salt. It appears to be a monohydrate. The crystalline monosodium and monopotassium salts are considerably less soluble in water than are corresponding disodium and di-potassium salts.

The temperature at which these various operations are conducted is not especially critical. However, because of the instability of $\alpha$-carboxybenzylpenicillin in aqueous acid or aqueous alkaline solutions it is advantageous to carry out the entire process, with the exception of the final drying step, at a temperature of from about 0° C. to about 30° C., the preferred range from about 5° C. to about 25° C. The only step of the process which can deviate from this range without detriment to the product is the final step of drying the crystalline salts. When using an alkali metal acetate or hydroxide as the neutralizing salt, it is desirable to operate at the upper limit of this temperature; e.g., about 20°–30° C. in order to achieve solubility of said salt in the $\alpha$-carboxybenzylpenicillin containing extract.

Adaptation of the above-described sequence [steps (a) to (h)] to the conversion of crude and/or amorphous forms of $\alpha$-carboxybenzylpenicillin and salts thereof to the crystalline mono- or di-alkali metal salts follows the above sequence in part. It is, of course, obvious that if one begins with an amorphous form of the acid, disodium salt, or other salt such as the potassium salt, one need not begin at step (a) above but may begin at step (c), step (d) or step (e), depending on the form, e.g., acid or salt and purity of the material to be converted.

In addition to the above-described process, various alternative extraction procedures are possible, as those skilled in the art will recognize. One such sequence which affords the crystalline mono- or di-alkali metal salts, and which is also applicable to aqueous reaction mixtures of $\alpha$-carboxybenzylpenicillin and salts thereof produced by the prior art methods and especially to those produced by the alkaline hydrolysis of esters of $\alpha$-carboxybenzyl-penicillin, such as $\alpha$-carbophenoxybenzylpenicillin, is a simplified version of the above-described process. This sequence comprises, in general, adjustment of the pH of the aqueous solution to a value of about 6 to about 7, followed by extraction of the neutral or essentially neutral solution with a water-immiscible organic solvent of the type mentioned in the above sequence and preferably with n-butanol or methyl isobutyl ketone. The aqueous solution is next adjusted to a pH of from about 2 to about 3.5 and extracted with n-butanol or methyl isobutyl ketone or other water-immiscible organic solvent as is mentioned above. The organic extract is then partially dried and treated with sodium and potassium 2-ethyl hexanoate or other equivalent salt, as described above. The same conditions and materials described in detail above apply in this alternative sequence. As those skilled in the art will recognize, the di-alkali metal salts of α-carboxybenzylpenicillin can be obtained by further neutralization of the mono-alkali metal salts. For this purpose, of course, the same, or a different, alkali metal salt used to prepare the mono-alkali metal salt can be employed. It is convenient to use an alkali metal hydroxide or bicarbonate for this additional neutralization.

Crystalline monosodium α-carboxybenzylpenicillin is, relative to the prior art described amorphous monosodium salt, of greatly improved stability upon storage. Table I below presents the results of an accelerated stability study of the two salts. The procedure comprised storing samples of the two salts at 65° C. for a period of 11 days and analyzing them at given intervals for their α-carboxybenzylpenicillin penicilloic acid content via the iodometric procedure set forth in the United States Pharmacopeia XIV, 429. This assay procedure also detects any α-carboxybenzylpenicillin penicillenic acid present. The assay is reported in terms of the penicilloic acid content of the sample.

TABLE I.

Stability of Amorphous and Crystalline Monosodium α-Carboxybenzylpenicillin at 65° C.

| time (days) | Amorphous Salt penicilloic acid (%) | carb.* (%) | %carb. retained | Crystalline Salt penicilloic acid (%) | carb.* (%) | % carb. retained |
|---|---|---|---|---|---|---|
| 0 | 7.8 | 84.5 | 100 | 3.96 | 89.20 | 100 |
| 1 | 18.0 | 74.0 | 87.6 | 3.85 | 88.25 | 98.8 |
| 2 | 25.2 | 66.0 | 78.1 | 3.96 | 85.70 | 96.1 |
| 4 | 27.1 | 62.2 | 73.7 | 3.85 | 87.80 | 98.4 |
| 7 | 30.25 | 55.2 | 65.4 | 4.56 | 86.00 | 96.4 |
| 11 | 33.10 | 46.8 | 55.4 | 5.20 | 85.50 | 95.8 |

*Carb. = monosodium α-carboxybenzylpenicillin determined by the standard hydroxylamine assay for penicillins.

A second study of the stability of amorphous and crystalline mono-sodium α-carboxybenzylpenicillin samples held at ambient temperature for 135 days and assayed as mentioned above produced the following results (Table II):

TABLE II.

Stability of Amorphous and Crystalline Monosodium α-Carboxybenzylpenicillin Stored at Ambient Temperature for 135 days

| Time (Days) | Amorphous Salt Penicilloic Acid (%) | Crystalline Salt Penicilloic Acid (%) |
|---|---|---|
| 0 | 7.8 | 3.96 |
| 135 | 14.7 | 4.05 |

A comparative hygroscopicity study of amorphous and crystalline monosodium α-carboxybenzylpenicillin, conducted by storing samples of the salts in an atmosphere of 50 percent relative humidity at 25° C. and periodically determining the increase in weight, showed the crystalline monosodium salt to be far less hygroscopic than the amorphous monosodium salt (Table III):

TABLE III.

Hygroscopicity of Amorphous and Crystalline Monosodium α-Carboxybenzylpenicillin at 50% Relative Humidity at 25° C.

| Sample | % Moisture Uptake Hours | | | | | |
|---|---|---|---|---|---|---|
| | 6 | 25 | 28 | 48 | 49 | 144 |
| Amorphous | — | — | 8.13 | 8.21 | — | 7.59 |
| Amorphous | 6.94 | 7.92 | — | — | 7.41 | — |
| Crystalline | — | — | 0.566 | 0.579 | — | 0.568 |

EXAMPLE I

Crystalline Disodium α-Carboxybenzylpenicillin from Crude Amorphous α-Carboxybenzylpenicillin A. Crude disodium α-carboxybenzylpenicillin (250 g.), prepared according to Example 3 of British Pat. 1,004,670 (see Preparation A), is dissolved in water (2.5 liters), methyl isobutyl ketone (600 ml.) added, and the mixture cooled to 5° C. The pH then adjusted to 2.2 by the addition, with stirring of 2N hydrochloric acid (approximately 650 ml.) over a 20-minute period. The mixture is thoroughly mixed and the methyl isobutyl ketone separated. The aqueous acid is extracted further with 2 × 600 ml. of methyl isobutyl ketone.

The extracts are combined, water (1,250 ml.) added, and the mixture cooled to 8° C. The pH is adjusted to 7.0 by addition of a saturated aqueous solution of sodium bicarbonate (1600 ml.) and the aqueous phase separated. n-Butanol (650 ml.) is added to the aqueous phase which is cooled to 5°–8° C. and adjusted to pH 3.0 by means of 2N hydrochloric acid (850 ml.). The mixture is thoroughly agitated, the n-butanol phase separated, and the aqueous phase extracted twice more with 400 and 250 ml. volumes of n-butanol. The n-butanol extracts are combined, dried with anhydrous sodium sulfate (600 g.), and filtered first through filter paper and then through a millipore filter unit (solvent resistant membrane type, porosity 2.2μ).

To the filtrate, there is then added sodium 2-ethyl hexanoate (2.1 equivalents in 950 ml. acetone) over a 1.5 hour period. Acetone is added as needed to maintain an easily stirrable suspension (total volume added is 2300 ml.). Stirring is continued for one hour at room temperature following addition of the sodium 2-ethyl hexanoate, after which the product is removed by filtration. The filter cake is reslurried in acetone at room temperature for 45 minutes, then filtered, and the reslurry step again repeated. The crystalline disodium salt is dried overnight under a stream of nitrogen. Further drying is accomplished by heating the product to about 65° C. in a drying oven. Overall yield = 178.5 g., 71 percent.

B. The use of 1.05 equivalents of sodium 2-ethyl hexanoate in the above sequence in place of 2.1 equivalents produces the crystalline mono-sodium salt.

Repetition of procedures A and B above, but back-extracting the methyl isobutyl ketone solution of α-carboxybenzylpenicillin at pH values of 4.0 and 6.5, rather than at pH 7.0, produces similar results.

EXAMPLE II

Crystalline Disodium α-Carboxybenzylpenicillin from Crude α-Carboxybenzylpenicillin A sample of crude α-carboxybenzylpenicillin (7.5 g.) is dissolved in water (75 ml.) to provide a 10 percent solution of the crude acid and cooled to 10° C. The pH is adjusted to 2.2 by means of 2N sulfuric acid, the solution extracted with methyl isobutyl ketone (3 × 20 ml.), and the combined extract dried with anhydrous calcium sulfate. The dried extract is filtered, cooled to 8° C., and treated dropwise with 18 ml. of an acetone solution of sodium 2-ethyl hexanoate (containing 0.2075 mg. of sodium salt per ml.). Acetone is added as needed to permit efficient stirring. After 1 hour at 8°-10 C., the crystalline disodium salt is removed by filtration, washed with acetone, and dried at 40° C.

Repitition of this procedure but using anhydrous magnesium sulfate, anhydrous sodium sulfate, centrifugation, filtration through cotton, or azeotropic drying in place of anhydrous calcium sulfate also produces the crystalline disodium salt.

EXAMPLE III

Crystalline Disodium α-Carboxybenzylpenicillin from an Ester of α-Carboxybenzylpenicillin A. Phenylmalonic Acid Monophenyl Ester Phosphorous oxychloride (421 g.) and phenol (576 g.) are added to phenylmalonic acid (1000 g.) in a 3-neck, 12-liter flask. The contents of the flask are mixed well and then heated on a steam bath for 4.5 hours under an atmosphere of nitrogen. The temperature of the mixture is not allowed to rise above 87° C. Under these conditions, the mixture forms a clear melt within about 15 minutes, and evolution of hydrogen chloride is almost complete in 4 hours. Benzene (3.8 liters) is added to the reaction vessel and the mixture refluxed for 45 minutes. The hot benzene solution is decanted from the gummy phosphoric acid and phenol into ice/water, the pH of the aqueous phase adjusted to 6.5 by addition of 8N sodium hydroxide, and finally to pH 7.8 by addition of 10 percent sodium carbonate solution. The mixture is mixed well and the aqueous extract collected. The benzene layer is washed with a small volume of water which is then combined with the first aqueous extract, and the combined aqueous solution adjusted to pH 2.2 by addition of concentrated hydrochloric acid. The heavy precipitate produced is extracted into chloroform (total volume, 5 liters), the extract washed once with water, dried (anhydrous sodium sulfate), and evaporated to a solid which crystallizes when triturated with hexane. The product is filtered, washed with a small volume of 5 percent chloroform in hexane, and air-dried. Yield = 430 g., m.p. 103°–110° C. (33 percent).

B. Phenylmalonyl Chloride Monophenyl Ester

Thionyl chloride (92.5 g.) is added to a solution of phenylmalonic acid monophenyl ester in methylene chloride (1,000 ml.) and the solution refluxed gently for 4 hours. Toluene (50 ml.) is added and the mixture evaporated under reduced pressure to provide the desired product as a syrupy amber liquid.

C. α-Carbophenoxybenzylpenicillin N-Ethylpiperidine Salt

A solution of 6-aminopenicillanic acid (86.4 g.) in water (850 ml.) is adjusted to pH 6.7 by addition of 8N sodium hydroxide, then cooled to 10° C. Phenylmalonyl chloride monophenyl ester is added in one portion and the mixture stirred vigorously for 40 minutes while the ph is maintained at pH 6.5–7.0 by addition of 2N sodium hydroxide. The cooling bath is removed from the reaction vessel 10 minutes after addition of the acid chloride is complete. The reaction mixture is acidified (pH 2.1) by addition of 2N hydrochloric acid and extracted with ethyl acetate. The combined ethyl acetate extracts are shaken with a 10 percent solution of potassium bicarbonate, the aqueous solution (pH 7.0–8.0) separated, and washed once with a small volume of ethyl acetate which is discarded. Fresh ethyl acetate is added to the aqueous solution followed by sufficient potassium chloride to salt the product out of the aqueous phase. The aqueous layer is discarded and fresh water added to the ethyl acetate solution. The potassium salt of the penicillin ester dissolves readily in the fresh water, and the ethyl acetate layer is discarded. The aqueous solution containing the desired product is acidified (pH 2.2) with 2N hydrochloric acid, extracted with ethyl acetate, and the extract dried ($Na_2SO_4$) and evaporated to provide 117 g. of crude α-carboxybenzylpenicillin phenyl ester. This material is redissolved in ethyl acetate (1000 ml.) and 35.3 ml. of N-ethylpiperidine added. The amine salt which crystallizes is collected by filtration and air-dried (97.0 g., 42.7 percent); m.p. 145°–147° C.

D. Hydrolysis of α-Carbophenoxybenzylpenicillin N-Ethylpiperidine Salt

Boric acid (61.8 g.) and potassium chloride (74.56 g.) are dissolved in water and sufficient water added to the solution to bring the volume to 2 liters. A sufficient amount of 0.5N sodium hydroxide is added to adjust the solution to pH 9.0. α-Carbophenoxybenzylpenicillin phenyl ester N-ethylpiperidine salt is dissolved in this buffer solution and the mixture stirred at room temperature (25° C.) for 2.5 hours. The reaction mixture becomes more acidic as hydrolysis occurs until, at the cessation of reaction, the mixture is pH 8.45. The mixture becomes turbid during the last 15 minutes of the reaction due to separation of by-product phenol from the weakly basic solution.

E. Isolation of Crystalline Disodium Salt

The reaction is cooled to 0°–10° C. and methyl isobutyl ketone (400 ml.) added, followed by sufficient 2N hydrochloric acid (ca. 250 ml.) to acidify the mixture to pH 2.2. The mixture is allowed to separate, the methyl isobutyl ketone extract collected, and the aqueous liquor extracted with two more volumes (each 300 ml.) of methyl isobutyl ketone. Water (200 ml.) is added to the combined extracts, the mixture cooled to 0°–10 C., and a solution of sodium bicarbonate (8 g. in 20 ml. H$_2$O) added dropwise over a 5-minute period. To the mixture, now pH 5.8, a small volume of saturated sodium bicarbonate solution is cautiously added to bring the pH to 7.0. The aqueous extract of α-carboxybenzylpenicillin sodium salt is collected and the methyl isobutyl ketone liquor extracted with two separate volumes (150 ml.) of water. n-Butanol (100 ml.) is added to the combined aqueous extracts and the mixture stirred and chilled to 0°–10° C. Sufficient 2N hydrochloric acid is added to bring the mixture to pH 3.0, the mixture allowed to separate, and the butanol layer collected. The acidic aqueous liquor is extracted twice with 75 ml. volumes of butanol, the combined butanol solutions (250 ml.) dried over anhydrous sodium sulfate (300 g.) for one hour, then filtered into a 1,000 ml. 3-neck flask equipped with a mechanical stirrer and an addition funnel. An acetone solution of sodium 2-ethyl hexanoate (169 ml. containing 207.5 mg. of salt per ml.) is added dropwise over a 20 to 30-minute period. When approximately one-half of the solution has been added, the mixture is seeded with crystalline disodium salt. The mixture is stirred for 30 minutes following addition of the sodium ethyl hexanoate, then acetone (225 ml.) added, and the mixture stirred for an additional 15 minutes. The crystalline disodium salt is collected by filtration on a sintered glass funnel under an atmosphere of dry nitrogen, and the filter cake washed with acetone (500 ml.). The cake is slurried in fresh acetone (1000 ml.), the slurry stirred at room temperature for 30 minutes, filtered as described above, and allowed to dry on the filter in a stream of dry nitrogen for 16 hours. The product is a white, free-flowing crystalline powder, slightly hygroscopic and readily soluble in water.

Yield = 25.6 g. (60 percent), m.p. 198°–201° C. dec.

Repetition of the above procedure but using an n-butanol solution of sodium 2-ethyl hexanoate in place of an acetone solution produces substantially the same results.

EXAMPLE IV

An aqueous hydrolysis mixture prepared according to the procedure of Example III–D is adjusted to pH 7 by addition of 2N hydrochloric acid, then extracted with n-butanol (3 × 200 ml.). The n-butanol extract is discarded. n-Butanol (100 ml.) is added to the aqueous phase, the mixture stirred, cooled to 5°–10° C., and brought to pH 2.2 by means of 2N hydrochloric acid. The n-butanol phase is allowed to separate, collected, and the aqueous layer extracted twice again with n-butanol (75 ml. each). The combined n-butanol extracts are dried over anhydrous sodium sulfate, filtered, and treated at 10° C. with sodium 2-ethyl hexanoate (169 ml. of acetone solution containing 207.5 mg. of sodium salt per ml.) over a 30-minute period. The mixture is stirred for one-half hour, 250 ml. acetone added, and stirring continued for an additional 15 minutes. The crystalline disodium salt is collected and dried under nitrogen.

EXAMPLE V

Repetition of the procedure of Example III–E but using 1.00 equivalent of sodium 2-ethyl hexanoate in place of 2.10 equivalents produces the crystalline monosodium salt.

In like manner, the crystalline mono- and di-potassium salts are prepared by the use of 1.00 and 2.20 equivalents of potassium 2-ethyl hexanoate in place of sodium 2-ethyl hexanoate.

EXAMPLE VI

The procedure of Example I is repeated but using a pH adjustment to 3.3 in the initial acidification step. Substantially the same results are obtained.

EXAMPLE VII

Crystalline Monosodium α-Carboxybenzylpenicillin

Butanol solutions of α-carboxybenzylpenicillin, prepared according to the procedure of Example III–A through III–E, are dried over anhydrous sodium sulfate or magnesium sulfate as noted below then treated with an organic solvent solution of a sodium salt to produce the monosodium salt.

| Drying Agent | % H$_2$O in BuOH[1] | Sodium Salt | Solvent | Mole equiv.[2] | T°C. | % yield |
|---|---|---|---|---|---|---|
| (a) Na$_2$SO$_4$ | 10.3 | 2-ethyl hexanoate | ethyl acetate | 0.90 | 0–5 | 66.5 |
| (b) Na$_2$SO$_4$ | 10.9 | 2-ethyl hexanoate | ethyl acetate | 0.95 | 15–25 | 96.5 |
| (c) Na$_2$SO$_4$ | 10.9 | 2-ethyl hexanoate | n-butanol | 0.95 | 15–25 | 95.5 |
| (d) Na$_2$SO$_4$ | 10.0 | acetate·3H$_2$O | ———[3] | 0.97 | 15–25 | 83.2 |
| (e) Na$_2$SO$_4$ | 15.6 | acetate·3H$_2$O | ——— | 1.1 | 15–25 | 82.0 |
| (f) Na$_2$SO$_4$ | 15.5 | acetate·H$_2$O | ——— | 1.0 | 15–25 | 66.7 |
| (g) MgSO$_4$ | 2.9 | acetate·3H$_2$O | ——— | 1.0 | 15–25 | 79.0 |
| (h) MgSO$_4$ | 2.9 | acetate·3H$_2$O | ——— | 1.2 | 15–25 | 86.0 |

[1] % water in n-butanol after drying
[2] molar equivalents of sodium salt used
[3] sufficient water is present in the n-butanol solution to completely dissolve the sodium acetate salt

EXAMPLE VIII

Disodium α-Carboxybenzylpenicillin

Monosodium α-carboxybenzylpenicillin (0.01 mole) prepared as in Example VII is added to an aqueous solution of sodium hydroxide (0.01 mole in 25 ml. water). The disodium salt is recovered by freeze-drying.

Similarly the di-potassium salt is prepared from the mono-potassium salt of α-carboxybenzylpenicillin and potassium hydroxide.

The above-mentioned alkali metal hydroxides can, of course, be replaced by the corresponding alkali metal bicarbonates or carbonates with substantially the same results.

EXAMPLE IX

Crystalline Mono-alkali Metal Salts
of α-Carboxybenzylpenicillin

The procedure of Example VII–(c) is repeated but using the following alkali metal salts in place of sodium 2-ethyl hexanoate:

| | |
|---|---|
| sodium caproate | potassium citrate |
| sodium oleate | potassium propionate |
| sodium ascorbate | potassium oleate |
| sodium glycolate | potassium caproate |
| sodium propionate | potassium ascorbate |
| sodium succinate | potassium glycolate |
| sodium cinnamate | potassium succinate |
| sodium caprylate | potassium cinnamate |

In each case the crystalline monosodium or potassium salt is produced.

EXAMPLE X

Crystalline Di-alkali Metal Salts
of α-Carboxybenzylpenicillin

The procedure of Example IX is repeated but using 2.20 equivalents of the alkali metal salts enumerated therein per equivalent of α-carboxybenzylpenicillin to produce the di-alkali metal salts.

EXAMPLE XI

Following the procedure of Example VII–(e) but using sodium and potassium hydroxide in place of sodium acetate trihydrate produces the corresponding mono-alkali metal salts of α-carboxybenzylpenicillin.

In like manner but using 2.0 equivalents of alkali metal hydroxide per equivalent of α-carboxybenzylpenicillin, the di-alkali metal salts are produced.

EXAMPLE XII

The procedure of Example VII–(h) is followed but substituting sodium and potassium methoxide in methyl isobutyl ketone for sodium acetate trihydrate. In each instance, the mono-alkali metal salt is produced.

The use of 2.0 equivalents of alkali metal methoxide produces the corresponding di-alkali metal salt of α-carboxybenzylpenicillin.

PREPARATION A

Crude Disodium α-Carboxybenzylpenicillin (British Patent 1,004,670 — Example 3)

A mixture of phenylmalonic acid (25 g., 0.140 mole) in dry ether (500 ml.), thionyl chloride (17.35 g., 0.145 mole), and a trace of dimethyl-formamide is refluxed for 3 hours, then evaporated under reduced pressure at room temperature (finally by co-distillation with dry benzene to remove the last trace of thionyl chloride).

The syrupy residue of mono acid chloride is dissolved in dry ether (300 ml.) and added to a stirred, ice-cold mixture of 6-aminopenicillanic acid (30 g.), water (275 ml.), ether (150 ml.), and N sodium hydroxide solution (135 ml.). The mixture is stirred for 30 minutes, the aqueous phase adjusted to pH 2 by addition of dilute hydrochloric acid, and the layers separated. The ether solution is washed with ice-cold water, saturated with ether (8 × 300 ml.), and then extracted with water to which sufficient dilute sodium hydroxide has been added to bring the aqueous phase to pH 7. Evaporation of the aqueous solution at low temperature and pressure, followed by drying the residual white powder in a vacuum desiccator, gives the crude disodium salt of α-carboxybenzylpenicillin (33.3 g.).

What is claimed is:

1. A process for making a crystalline alkali metal salt of α-carboxybenzylpenicillin which comprises
   treating a solution of α-carboxybenzylpenicillin in a solvent selected from the group consisting of n-butanol and methyl isobutyl ketone,
   said solution containing from about 3 percent to about 20 percent by weight of water, with an alkali metal salt selected from the group consisting of
   a. an alkali metal salt of an organic acid selected from the group consisting of 2-ethyl hexanoic, caproic, oleic, ascorbic, glycolic, propionic, acetic, succinic, cinnamic, caprylic and citric acids;
   b. an alkali metal hydroxide; and
   c. an alkali metal methoxide,
   wherein the alkali metal is selected from the group consisting of sodium and potassium.

2. The process of claim 1 wherein a molar ratio of an alkali metal salt of group (a) to α-carboxybenzylpenicillin of at least about 1:1 is used and the crystalline alkali metal salt of α-carboxybenzylpenicillin separated therefrom.

3. The process of claim 3 wherein the alkali metal salt is selected from the group consisting of an alkali metal salt of acetic acid and an alkali metal salt of 2-ethyl hexanoic acid.

4. The process of claim 3 wherein an n-butanol solution of α-carboxybenzylpenicillin containing at least about 5 percent α-carboxybenzylpenicillin by weight and from about 3 percent to about 15 percent by weight of water is treated with at least a 2:1 molar proportion of sodium 2-ethyl hexanoate in acetone and the crystalline disodium salt is separated therefrom.

5. The process of claim 3 wherein an n-butanol solution of α-carboxybenzylpenicillin containing at least about 5 percent α-carboxybenzyl-penicillin by weight and from about 3 percent to about 15 percent by weight of water is treated with from about 0.8 to about 1.2 molar proportion of sodium 2-ethyl hexanoate in n-butanol and the crystalline monosodium salt is separated therefrom.

6. A process for making a crystalline alkali metal salt of α-carboxybenzylpenicillin wherein the alkali metal is selected from the group consisting of sodium and potassium which comprises:
   a. adjusting the pH of an aqueous alkaline solution of α-carboxybenzylpenicillin to about 2 to about 3.5,
   b. extracting the aqueous acid solution thus produced with a water-immiscible organic solvent selected from the group consisting of n-butanol and methyl isobutyl ketone,
   c. drying said water-immiscible organic solvent extract to a water content of from about 3 percent to about 20 percent by weight,
   d. treating said dried extract with an alkali metal 2-ethyl hexanoate, and
   e. separating the crystalline alkali metal salt.

7. The process of claim 6 wherein the concentration of α-carboxy-benzylpenicillin in the aqueous alkaline solution is from about 0.5 percent to about 20 percent by weight.

8. The process of claim 7 wherein the water-immiscible organic solvent is methyl isobutyl ketone.

9. The process of claim 7 wherein the water-immiscible organic solvent is n-butanol.

10. The process of claim 7 wherein the dried n-butanol extract is treated with at least about a 1:1 molar proportion of sodium 2-ethyl hexanoate dissolved in a solvent selected from the group consisting of acetone, ethyl acetate, n-butanol, and isopropanol.

11. A compound selected from the group consisting of the crystalline monosodium salt and the crystalline monopotassium salt of α-carboxybenzylpenicillin.

12. A compound selected from the group consisting of the crystalline disodium salt and the crystalline dipotassium salt of α-carboxybenzyl-penicillin.

13. The crystalline disodium salt of α-carboxybenzyl-penicillin.

* * * * *